US009514461B2

(12) United States Patent
George et al.

(10) Patent No.: US 9,514,461 B2
(45) Date of Patent: Dec. 6, 2016

(54) SYSTEMS AND METHODS FOR ANALYSIS OF CONTENT ITEMS

(75) Inventors: William Brandon George, Pleasant Grove, UT (US); Kevin G. Smith, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 146 days.

(21) Appl. No.: 13/408,957

(22) Filed: Feb. 29, 2012

(65) Prior Publication Data

US 2014/0289389 A1 Sep. 25, 2014

(51) Int. Cl.
*G06F 15/173* (2006.01)
*G06Q 30/00* (2012.01)
*G06F 17/30* (2006.01)

(52) U.S. Cl.
CPC ......... *G06Q 30/00* (2013.01); *G06F 17/30705* (2013.01)

(58) Field of Classification Search
CPC ............ G06F 17/30663; G06F 17/3089; G06F 17/30964; G06F 17/30713; G06F 17/27; G06F 17/30705
USPC .......................................... 709/224; 705/7.29
See application file for complete search history.

(56) References Cited

U.S. PATENT DOCUMENTS 6,366,933 B1 * 4/2002 Ball .................. G06F 17/30899 707/E17.119
8,265,925 B2 * 9/2012 Aarskog ............... G06F 17/271 704/1
8,473,495 B2 * 6/2013 Grieselhuber .... G06F 17/30864 707/737
2001/0021938 A1 * 9/2001 Fein .................... G06F 17/2715 715/267
2004/0260600 A1 * 12/2004 Gross ..................... G06Q 30/02 705/7.31
2006/0075019 A1 * 4/2006 Donovan .......... G06F 17/30867 709/203
2007/0168483 A1 * 7/2007 Lunt ...................... G06Q 30/02 709/223
2007/0253678 A1 * 11/2007 Sarukkai ........... G06F 17/30787 386/241
2008/0059544 A1 * 3/2008 Rahim ................ G06F 21/6218
2009/0138356 A1 * 5/2009 Pomplun ........... G06F 17/30864 705/14.69

(Continued)

FOREIGN PATENT DOCUMENTS

GB WO 2008032037 A1 * 3/2008 ....... G06F 17/30702
WO WO 2008032037 A1 * 3/2008 ............. G06F 17/30

*Primary Examiner* — Farid Homayounmehr
*Assistant Examiner* — Lizbeth Torres-Diaz
(74) *Attorney, Agent, or Firm* — Kilpatlrick Townsend & Stockton LLP

(57) ABSTRACT

A content analyzer retrieves content items from one or more content sources. The content items have a corresponding date and time assigned representing when the content item was published. The content analyzer is further configured to determine a frequency count for each of a plurality of terms within the plurality of content items for a specified time period. In some embodiments, the content analyzer identifies a change in the frequency count for each of the plurality of terms relative to a respective baseline frequency count for the respective one of the plurality of terms. In some embodiments, a report representing the change in the frequency count for each of the plurality of terms is generated.

15 Claims, 10 Drawing Sheets

(56) References Cited

U.S. PATENT DOCUMENTS

| | | | | | |
|---|---|---|---|---|---|
| 2010/0114739 | A1* | 5/2010 | Johnston | G06Q 30/0601 | 705/26.1 |
| 2011/0190035 | A1* | 8/2011 | Vanden Heuvel | G06F 17/30713 | 455/566 |
| 2011/0313852 | A1* | 12/2011 | Kon | G06F 17/30864 | 705/14.46 |
| 2013/0054784 | A1* | 2/2013 | Yadav | H04L 43/0876 | 709/224 |
| 2015/0106156 | A1* | 4/2015 | Chang | G06Q 30/0201 | 705/7.29 |
| 2015/0155954 | A1* | 6/2015 | Xu | H04B 17/21 | 375/231 |

* cited by examiner

[8/13 vs 8/16] BlueSkies Travel ~550

Content Source | Home new
accused                                          baltimore  time        girl
                york   way                                              exclusively
go            tickets  sale~560  representation                         drunk
vacation       skier                    online
  discounts         us     family  will  one
  december        now                                          stay
  2011           select    day             let      olympic
robert                              man      year

[8/13 vs 8/16] BlueSkies Travel ▶ today ~575

@authorxyz
Lorem ipsum dolor sit amet, consectetur adipisicing elit, sed do eiusmod tempor BlueSkies Travel labore et dolore magna aliqua. Ut enim ad today veniam 525

@authorABC
Lorem ipsum today sit amet, consectetur adipisicing elit, sed do eiusmod BlueSkies Travel ididunt ut labore et dolore @author123
Today ipsum dolor sit amet, consectetur adipisicing elit, sed do eiusmod BlueSkies Travel ut labore et dolore magna aliqu. Ut @authorSDF
RT: @author123: Today ipsum dolor sit amet, consectetur adipisicing elit, sed do eiusmod BlueSkies Travel ut labore @authorKFKF
BlueSkies Travel dolor sit amet, today adipisicing elit, sed do eiusmod tempor incididunt ut labore et dolore magna aliqu http://t.co/lorem @authorTTw
Lorem ipsum today sit amet, consectetur adipisicing elit, sed do eiusmod tempor BlueSkies Travel dolore magna 515

@authorMCmcMC
Lorem ipsum dolor BlueSkies Travel today dipisicing

@author$45
Lorem ipsum dolor sit amet, consectetur adipisicing elit, sed do eiusmod tempor incididunt ut today et dolore Magna #BlueSkies Travel. Ut enim http:/t.co/loremi @author87
Lorem ipsum dolor sit amet, consectetur BlueSkies Travel do eiusmod tempor incididunt today et dolore @author99
Lorem ipsum dolor#BlueSkies Travel today adipisicing elit, sed o eiusmod tempor incididunt labore et @author324
BlueSkies Travel dolor sit amet, consectetur today!!!

@author990

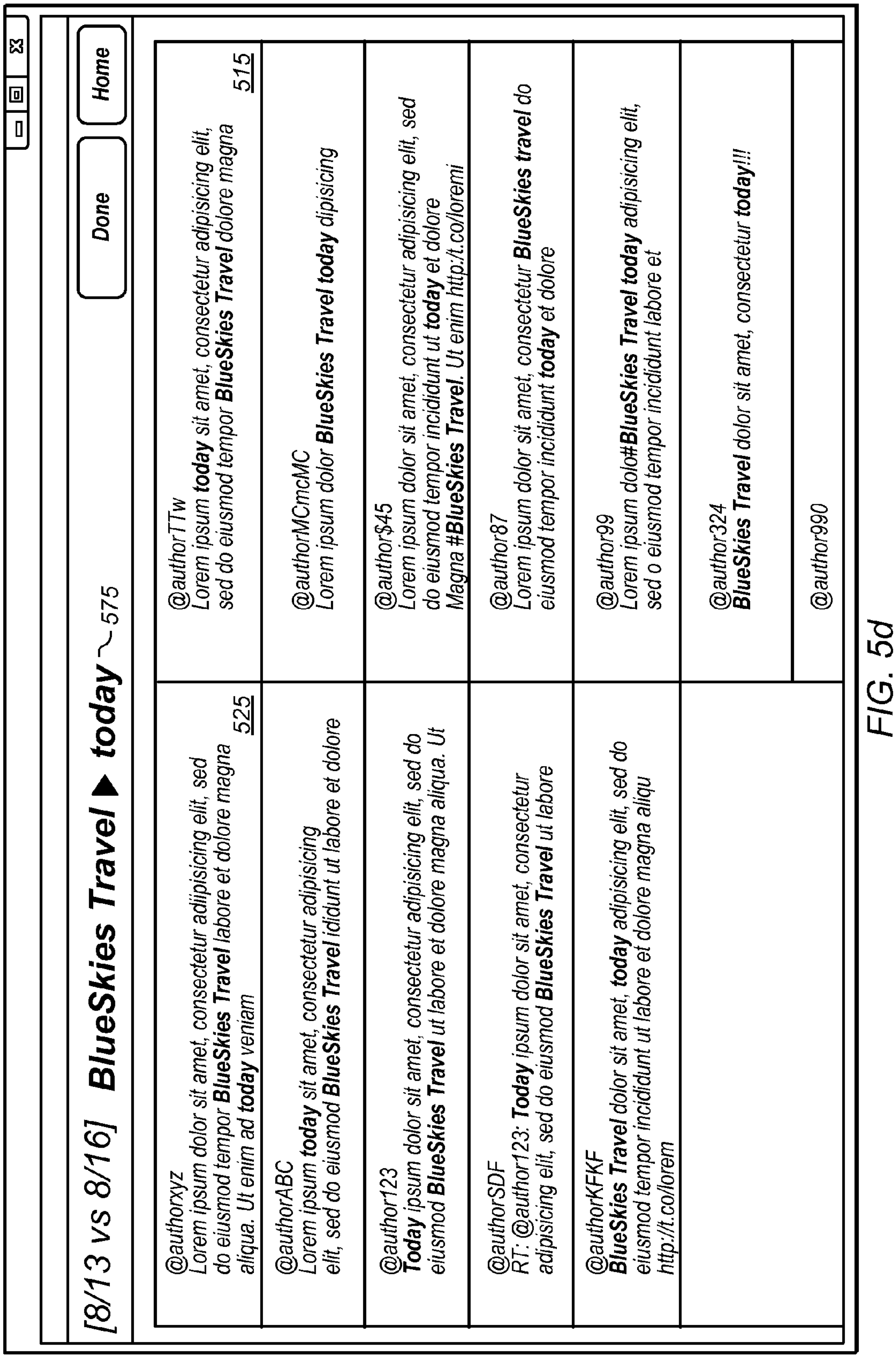

FIG. 5d

SYSTEMS AND METHODS FOR ANALYSIS OF CONTENT ITEMS

BACKGROUND

Computing devices have become widely available in recent years. Examples of computing devices are laptops, tablets and smart phones. Typically a wide variety of software and/or applications are implemented on the computing devices. The most prevalent software is web-based browsers that offer access to the internet and all of the content sources available via the Internet (e.g., website). The content items available via web-based browsers and the Internet is, for example, news (e.g., local newspaper/news stations, BBC™, CNN™, etc.), blogs (e.g., personal or business commentary), social media (e.g., FACEBOOK™, TWITTER™, MYSPACE™, etc.), informational websites (e.g., WIKIPEDIA™, HOWSTUFFWORKS™) and on-line retail (e.g., AMAZON™, OVERSTOCK™, EBAY™ etc.). The content items on these websites may be direct contributions from a business and, in some cases, comments submitted by visitors to the business website. Other website content items may be from multiple contributors (e.g., articles on a news website) or from an individual contributor (e.g., blogs). These websites often offer comment sections for readers to comment on the content items (e.g., new stories, products, blogs). Social media websites offer subscribers an interactive way to share information and photos.

Businesses may implement software to measure traffic on their business website. The software may measure the number of visits to their business website, the links within the business website that a visitor accesses, time spent on the business website or the types of advertisements that load on the business website, for example. The measurement of website traffic is useful to marketers wanting to measure the effects of an advertising campaign, for example. The measurement of website traffic may also provide useful information to a business owner for implementing improvements to their business website. For example, a business may have recently implemented a new print media marketing campaign or have several news stories associated with the business. In the timeframe of the start of the campaign or the news stories the business website traffic may change (e.g., increase or decrease). Based the website traffic changes, the marketers may infer that the print campaign or the news stories caused the website traffic change.

However, while the information from measuring traffic on a website is useful, there is no direct correlation to content items on other content sources (e.g., social media sites, blogs, retail websites, etc). Many of the content sources described above have millions of subscribers or readers. The sheer magnitude of information available from these websites for data mining makes the sites described above very valuable to businesses wanting to analyze content items associated with a specific product or topic.

SUMMARY

Various embodiments of methods and systems for analyzing content items are presented. In some embodiments, a plurality of content items are retrieved from one or more content sources. In some embodiments, each of the plurality of content items comprises a corresponding date and time assigned when the respective one of the plurality of content items is published on a content source. In some embodiments, a frequency count for each of a plurality of terms within the plurality of content items is determined for a specified time period. In some embodiments, determining the frequency count for each of the plurality of terms within the plurality of content items for the specified time period further comprises indexing the terms in the content items. In some embodiments, changes in the frequency count for each of the plurality of terms relative to a respective baseline frequency count for the respective one of the plurality of terms are identified. In some embodiments, the baseline frequency is the average frequency count of the terms over a baseline time period. In alternate embodiments, the baseline frequency count is a frequency count of a selected time period.

In some embodiments, a report representing the change in the frequency count for each of the plurality of terms is generated. In some embodiments, the change in frequency count for one or more of the plurality of terms within the plurality of content items for the specified time period is displayed. In some embodiments, a selection of one of the plurality of terms is received. In some embodiments, the selection filters the plurality of content items. In some embodiments, the frequency count for the one or more of the plurality of terms from the plurality of content items filtered with the selection is re-displayed.

BRIEF DESCRIPTION OF THE DRAWINGS

FIGS. 5A-D depict an exemplary set of reports in accordance with an embodiment of the present technique.

Figure 1A:
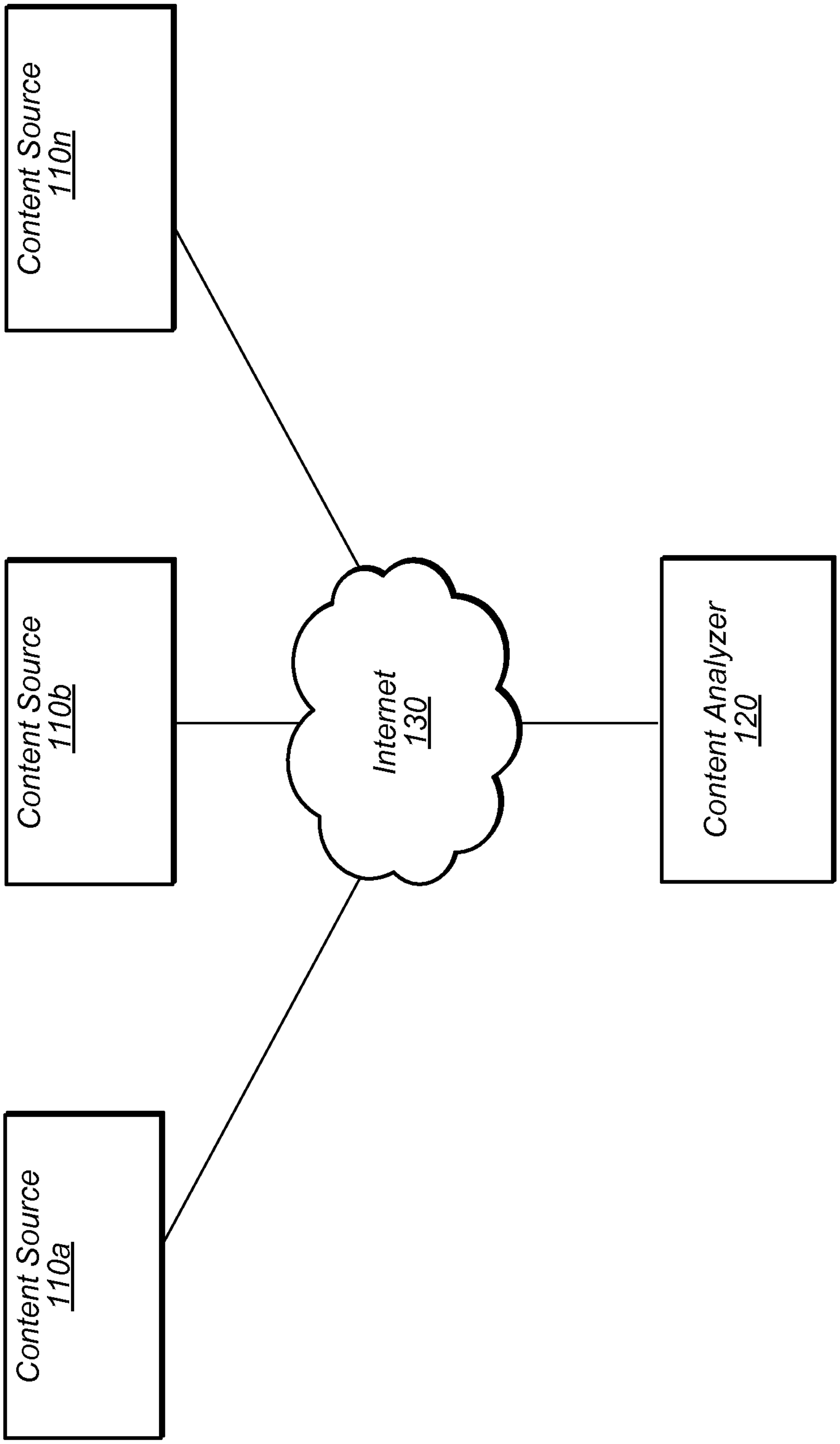
FIGS. 1A-B illustrate an exemplary configuration that supports analysis of content items in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, provided in some embodiments are systems and methods for analyzing content items. In some embodiments a plurality of content items is retrieved from one or more content sources. In some embodiments, each of the plurality of content items retrieved from the one or more content sources comprises a corresponding date and time assigned when the respective one of the plurality of content items is published on the content source. In some embodiments, a frequency count for each of a plurality of terms within the plurality of content items for a specified time period is determined. The change in the frequency count for each of the plurality of terms relative to a respective baseline frequency count for the respective one of the plurality of times is identified. A report representing the change in the frequency count for each of the plurality of the terms is generated, in some embodiments. In some embodiments, receiving a selection of one of the plurality of terms causes the content items to be filtered with the selection. In some embodiments, the frequency count for the one or more of the plurality of terms from the content items is re-displayed.

For example, a business may implement a marketing campaign for a product in several popular magazines. The business may then note a change in the accesses to the website and an improved conversion rate for sales of the product. The time period may correlate to the launch of the magazine marketing campaign. The marketer may wish to have direct correlation between aspects of the marketing campaign and the conversion rate. To achieve the direct correlation, the comment section of the business website associated with the product may be analyzed along with social media sources and content sources that provide product reviews. The terms for the content analysis may be the product name, the business name or descriptive terms associated with the product. A search of the content sources described above may locate 500 individual content items comprising the terms over a single 24-hour time period corresponding to the launch of the marketing campaign. The frequency count of each of a plurality of terms within the content items may then be determined. The results may be compared to the frequency count of terms within content from one or more time periods preceding the launch of the marketing campaign. The results may then be graphically presented such that color and/or font size indicate the direction and magnitude of the change in the frequency of occurrence between the two time periods of interest. Selecting the term with the largest magnitude of change, for example, filters the content items with the selected terms. Selecting multiple terms in succession will continue to filter the content items such that quantity of actual content items filtered with the terms may be narrowed to an easily reviewable level, for example. The marketer may then directly correlate content to the successful and/or unsuccessful aspects of the marketing campaign.

In another example, a marketer or business analyst may be in the planning stages of a marketing campaign or product placement intended for the time frame of a major sporting event (e.g., football's SUPER BOWL™ or baseball's WORLD SERIES™). The analyst may use a content analyzer to search content posted during the two week period leading up to the sporting event. The content items posted during the time period may be analyzed to determine the frequency count of the terms within in the content items from the two week time period. The frequency count of terms within the content items may be used to determining the best opportunities for a successful marketing campaign for future sporting events.

Figure 1B:
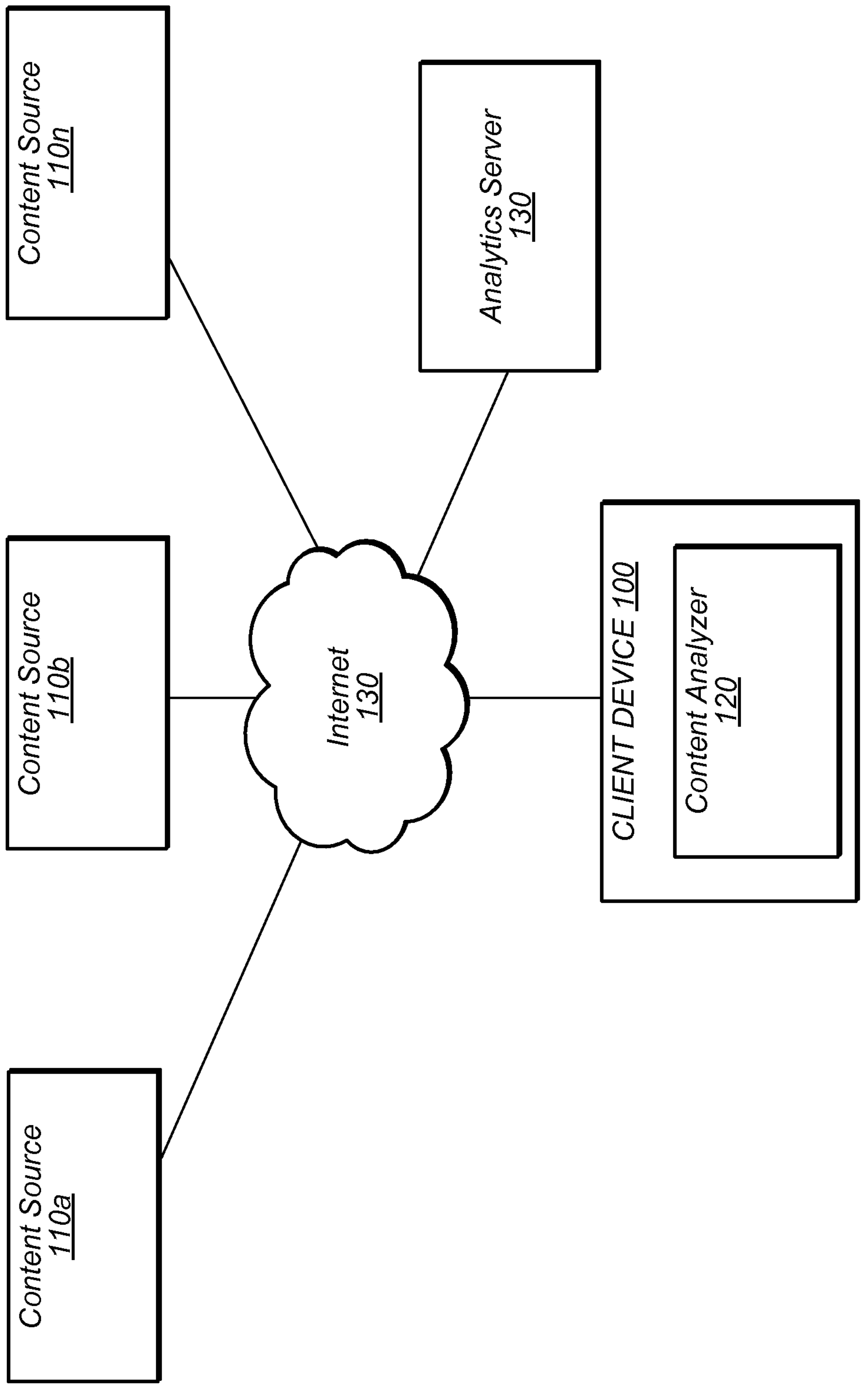

FIGS. 1A-B illustrate an exemplary configuration that supports analysis of content items in accordance with one or more embodiments of the present technique. In general, a content source 110 is one or more web pages viewable from a web-based browser implemented on one or more computing devices (not explicitly shown). The web pages include content items describing a business or product, news content, personal content (e.g., blogs) or social media content, for example. In some embodiments, a content analyzer 120 implemented on one or more computers (not explicitly shown) analyzes the content items of one or more content sources 110. Content analyzer 120 retrieves content items and determines the frequency count of the terms within the content items. A report may be generated and the change in the frequency count of terms within the content items displayed, for example. In some embodiments, the displayed terms and or content sources are selectable. Selecting the terms may filter the content items and selecting the content source displays the content items corresponding to the content source, in some embodiments. This will be described in further detail below.

In some embodiments, content source 110, in FIG. 1A, is one or more web pages viewable via a web-based browser hosted on one or more local computing devices, host servers or other computing devices world wide. The web pages accessible via internet 130 may be accessed by multiple users or subscribers, for example. Examples of content source 110 are news websites (e.g., BBC™, CNN™), social media websites (e.g., TWITTER™, FACEBOOK™), blogs (e.g., personal websites), retail websites (e.g., EBAY™, AMAZON™, OVERSTOCK™) and informational websites (e.g., WIKIPEDIA™). Each content source may have multiple web pages for displaying the content items, in some embodiments. It has been estimated that the number of individual websites numbers in the billions (e.g., as indexed by search engine GOOGLE™).

In some embodiments, content analyzer 120 is implemented on one or more computing devices. Content analyzer 120 may be configured to retrieve a plurality of content items from one or more content sources, for example. As described above, the plurality of content items may be from news sources, blogs, retail websites and/or social media sites. The plurality of content item may be, by way of non-limiting example, articles, product reviews, customer and/or reader comments or subscriber content (e.g., TWEETS™ or FACEBOOK™ posts shared between subscribers). While the examples of content sources presented herein are discussed with respect to web sites or other content on the world wide web, one of skill in the art will readily ascertain in light of having read the present disclosure that the invention is not so limited, and that systems other than the web (e.g., SMS messaging, email, or other content and message systems yet to be invented) fall within the scope and intent of the present disclosure. In some embodiments, the plurality of content items may be retrieved for a given time period. A time period may be a day, an hour, a week, for example. The content items may have a date and time associated with the content item is published or posted, for example. In some embodiments, the frequency count of terms within the plurality of content items are determined. Terms may be single words or phrases, for example. In some embodiments, non-contributing terms such as "the" or "a" are not included in the count.

In some embodiments, a report is generated to display the frequency count. The displayed frequency count may indicate the magnitude of the frequency of occurrence, for example. In some embodiments, the font size of the displayed terms may indicate the magnitude of the frequency count. In some embodiments, the displayed terms are selectable and cause further filtering of the content items to content items comprising the selected term. The frequency count from the filtered content items may then be re-displayed, for example. In some embodiments, the content sources are selectable or determined by the user. In some embodiments, the displayed report includes options to select the content source or allows the user to determine the content source. Selecting the content source displays the content items comprising the selected terms. In some embodiments, to facilitate accessing the content items from the content source, the content analyzer indexes the terms in addition to the frequency count of each term. In some embodiments, indexing the terms comprises storing information comprising the frequency count, the content item and the content source associated with the term.

For example, a marketer may have implemented a new marketing campaign for a product. The marketers may monitor multiple content sources for mentions of the product (e.g., content items). On the day after the new marketing campaign was implemented the marketer may wish to assess the impact of the new marketing campaign. The marketer may use a content analyzer to retrieve content items with the product name from that day (e.g., time period) from content sources. The content analyzer may index the terms and determine a frequency count in the retrieved content items for that day. The frequency count may be compared to a pre-determined average frequency count. Terms with the highest change frequency count may indicate a trend in the content items. For example, the terms “like”, “better” and “service” may be the most frequent terms. The marketer may select “better” and the content analyzer filters the content to show the frequency count of terms within content items that comprises both the product name and the term “better”. In the filtered content items (e.g., filtered with the product name and “better”), the marketer may select a content source and read the content items that has both the product name and “better” in it.

From the content items filtered with the selected term “better” and the product name, the marketer may determine that the trend in the content items is that the product is “better” or improved. In addition, the marketer may notice in the same view of the display comprising the filtered information that the term “service” continues to have a high frequency count in the content items filtered with the selected term “better” and the product name. The marketer may select the term “service” to further filter the content items to content items comprising the term “service”. The filtered content items may indicate that terms such as “bad”, “poor”, “inattentive” are terms with the highest frequency count. The marketer may then select a content source to review the filtered content (e.g., content that is filtered with the product name, “better” and “service”) so that the reviews may be fed back to customer service.

FIG. 1B is an alternate embodiment where an analytics server may be used in conjunction with the content analyzer and content sources as described above in FIG. 1A. The analytics server may monitor onsite traffic (e.g., a business website) or offsite traffic (e.g., websites separate from the business website) on a periodic basis, for example. The periodically monitored information may provide a baseline for website traffic and trends in topics, for example. In some embodiments, the time periods corresponding to the peaks and valleys in the website traffic or trend chart are further analyzed by a content analyzer. The content analyzer retrieves the content items corresponding to the time period of the peaks and valleys to determine the frequency count of terms in content items.

In some embodiments, analytics server 130, as discussed above, monitors traffic. The onsite traffic information may include the number of accesses to the website or to given links on the website, for example. The offsite traffic information may include monitoring trends on given websites or the internet as a whole, for example. In some embodiments, the trends may be related to the product or service of a given business. The monitored information may be plotted on trend charts reporting the periodic results, for example. The periodic information is averaged to provide a baseline frequency of occurrence of particular terms, in some embodiments. Peaks and valleys in the chart may indicate time periods that need further investigation, for example.

In some embodiments, content analyzer 120 may be implemented on client device 100. In some embodiments, the client device receives the periodic traffic information that indicates particular time periods to analyze. In some embodiments, the content analyzer retrieves content items for the particular time period and uses the same terms that were used to monitor the onsite and offsite traffic to filter the content items prior to retrieving it. The content analyzer may determine the frequency count of the terms in the content items and compare the results to a baseline frequency count of the same terms, for example. The baseline may be determined by periodically (e.g., daily, hourly weekly) retrieving content items and determining the frequency count of terms, for example. In alternate embodiments, the content analyzer receives two time periods to compare instead of comparing to a baseline. In some embodiments, the time periods are determined by the traffic information received from the analytics server. In any of the embodiments described above, the frequency count of the terms from the content items is compared to the baseline or alternate time period to determine the change in the frequency of occurrence of the term. This will be described in further detail below. This information may be displayed as described above in FIG. 1A. In addition, the content items may be filtered an analyzed as described above, for example.

As an example, a retail business may utilize an analytics server to routinely monitor the traffic at the retail website. The traffic information reported may include, but is not limited to, the number of views, the links that were selected or how long each visitor remained on the website. The business may also monitor terms (e.g., product name, business name, phrase corresponding to a brand identity) in the content items provided by customers in the product review section. The business may also monitor three independent, external to the business product review sites and a social media website with the same terms. The analytics server may provide a report or a graph showing the trends of the terms on an hourly or daily basis, for example. In the report or graph, a sudden spike may appear in the trend data after a relatively flat week. Based on the information from the report, the content analyzer may receive the time period of the spike and the time period a week before the spike as the two time periods to compare. The content analyzer may retrieve the content items from the two time periods. Only the content with the terms that were monitored by the analytics service may be retrieved.

The frequency count of the terms in the content items from the two dates are determined and compared to determine the change in the frequency count of the terms. The terms are indexed to track the frequency count, content item and content source of the term. The results may be graphically displayed such that font size of the term indicates the magnitude in the change of the frequency count. The color of the term in the display may indicate an increase or a decrease in the change of the frequency count. The initial results of the content items may show that “sale” is the term with the greatest change in the frequency count followed by the term “great deals.” Selecting the term “sale” further filters the content items to include content comprising the term “sale”. The filtered results may indicate that the terms “great deals” and “jeans” are the terms in the filtered content items with the greatest change in the frequency count. At any point, the content source may be selected to review the actual content comprising the initial terms and "sale". If the social media content source was selected the filtered content items may show conversations about the "great deals on jeans". If the product review content source was selected, there may not be a significant amount of content contributing to the terms, "sale", "great deals" and "jeans." It may be possible to conclude that the current sale is a success and generated the extra traffic.

Figure 2:
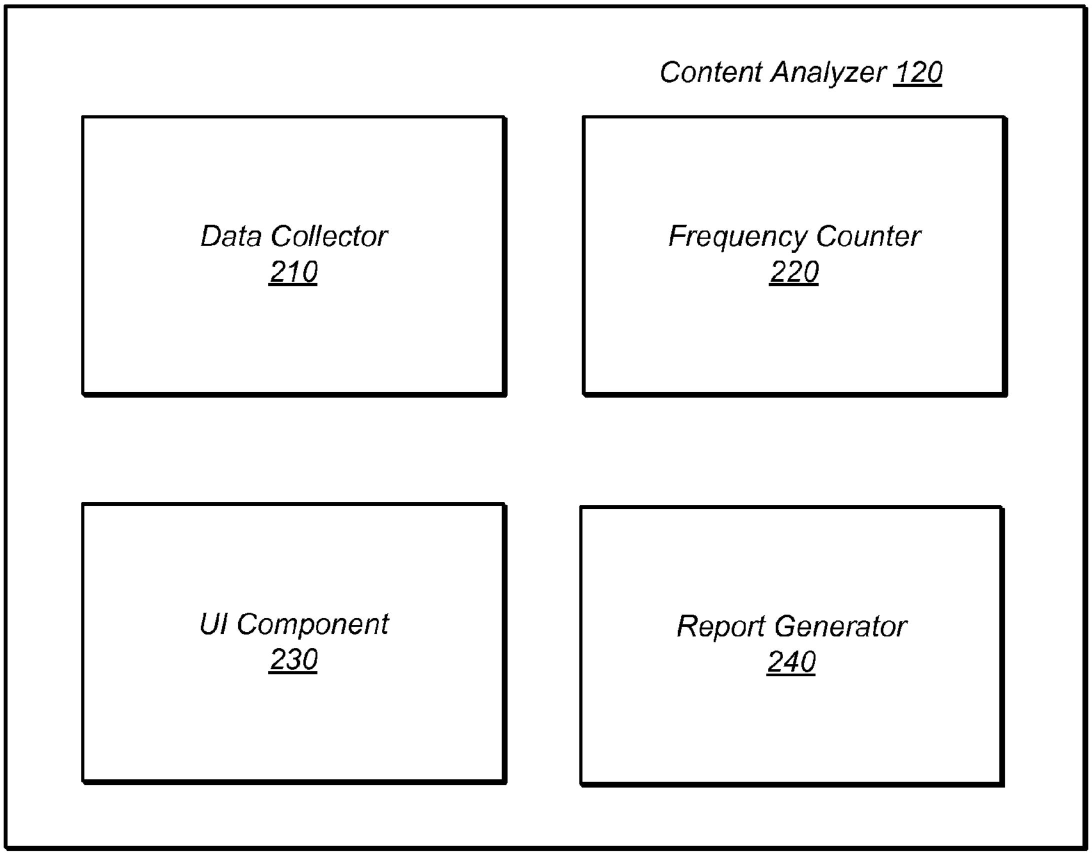
FIG. 2 illustrates an exemplary configuration of a content analyzer in accordance with one or more embodiments of the present technique.

FIG. 2 illustrates an exemplary configuration of a content analyzer in accordance with one or more embodiments of the present technique. In general, in some embodiments, a content analyzer is implemented on one or more computers configured to retrieve and analyze a plurality of content items from one or more content sources (e.g., content source 110 in FIGS. 1A-1B). The content analyzer may retrieve the plurality of content items from one or more content sources into a data collector, for example. In some embodiments, the content items are submitted to a frequency counter. For example, the frequency counter may determine the frequency count of terms and filter any characters or words that may skew results (e.g., sale vs. sale!). In some embodiments, the content analyzer further includes a report generator and a user interface (UI) component. The report generator may filter and/or organize the results and the UI component may display the results, for example. In some embodiments, if a term is selected in the results displayed by the UI component, the report generator filters the data and provides updated results to the UI component.

In some embodiments, data collector 210 locates or retrieves content items from one or more content sources. For example, the data collector may retrieve content items from a website such as a social media website via an API (e.g., application programming interface). In some embodiments, the API allows data collector 210 to retrieve particular content items (e.g., comments on retail or news sites for a given topic or social media content for a particular demographic) or retrieve all content items for a given time period. As an example, to retrieve particular content items, the data collector may retrieve content comprising particular terms (e.g., product name, brand identity phrases etc.). On other websites, for example, the content may be an article posted during the given time period that is retrieved in its entirety.

In some embodiments, data collector 210 retrieves content items from one or more content sources for given time periods. For example, data collector 210 may retrieve content from two separate time periods for comparison. In some embodiments, data collector 210 retrieves content from time periods preceding or following the selected two time periods in preparation for user request to change the time period. In alternate embodiments, data collector 210 retrieves content items from one or more content sources on a periodic basis to build a baseline for comparison to any selected time period. In other embodiments, data collector 210 retrieves one or more time periods to compare a single time period to multiple time periods, where the multiple time periods are analyzed to determine an average. For example, this embodiment may be used to compare a given day to the average over a week prior to the given day.

In some embodiments, frequency counter 220 is configured to count the terms in the plurality of content items retrieved by data collector 210. In some embodiments, the frequency count of terms such as "the" and "a" and punctuation is not determined. This may avoid separately indexing two terms that are differentiated only by punctuation, for example (e.g., sale and sale!). In some embodiments, the frequency counter determines the frequency count of the terms for the plurality content items from each of the plurality of content sources (e.g., content source 110 in FIGS. 1A-B).

In alternate embodiments, frequency counter 220 is also configured to index and count the terms in the plurality of content items. Indexing the terms includes parsing the terms from the plurality of content items and maintaining information corresponding to the index terms. The information corresponding to the indexed terms may include the frequency count for each of the plurality of indexed terms, the content item and the content source for the term.

In some embodiments, report generator 240 filters and/or organizes the counted terms and/or indexed and counted terms from frequency counter 220. The report generator may be configured to organize and or analyze the counted terms from each of a plurality of content items, for example. In addition, in some embodiments, report generator 240 filters the counted terms when additional terms are selected in UI component 230. In some embodiments, report generator 240 determines the change in the frequency count of terms between two particular time periods. The particular time periods may be a specific date or an average over time as described above, for example.

In some embodiments, UI component 230 is configured to display the results determined by frequency counter 220 and report generator 240. In some embodiments, UI component 230 displays the traffic information received from an analytics server (e.g., analytics server 130 in FIG. 1A). From the traffic information time periods of interest may be determined and selected, for example. In some embodiments, selecting the time period of interest causes data collector 210 to retrieve content items from the selected time period of interest. In alternate embodiments, a baseline time period of interest is selected for comparison to a given time period. In addition, in some embodiments, UI component 230 displays the results of frequency counting and provides selectable terms. Selecting a term further filters the content items and the frequency counted terms, in some embodiments. In some embodiments, UI component 230 is configured to present individual selections (e.g., a link or "button" to click or select) for each content source contributing to the report. Selecting the content source may provide a plurality of filtered content, for example (e.g., filtered with selectable, indexed terms). As described above, indexing terms includes tracking the frequency count and content source associated with each of the plurality of terms.

For example, a researcher may be interested in content associated with a recent news event. (e.g., sporting event, natural disaster, IPO for tech startups, etc) The researcher may determine search terms and a particular time period to search within ten separate content sources, for example. The data collector in the content analyzer may retrieve the plurality of content items comprising the search terms from the ten content sources. The content indexer and frequency counter may determine the terms within the content items and determine the frequency count of the terms. The report generator may organize the indexed terms for display on the UI component. Terms with the greatest frequency count may be graphically indicated (e.g., font size, color, order list, bar graph, etc.) If a selected term is received, the report generator may filter the content items with the selected term and re-display the report on the UI component. After filtering the content items with the selected and/or indexed terms, the researcher may select one of the ten content sources to view the filtered plurality of content items corresponding to the selected content source.

As another example, a small business owner may monitor their page views on the business website and the business revenue on a periodic basis via an analytics server. The most recent report from the analytics server may indicate a sharp decrease in revenue and a decline in page views. To determine the reason for the decline, the business may use a content analyzer to retrieve a plurality of content items (e.g., customer feedback) from the retailers that sell their product for the time period corresponding to the most recent report. The data collector in the content analyzer may submit the retrieved plurality of content items to the frequency counter. The frequency counter may count and index the terms within the plurality of content items. In addition, the data collector may retrieve content items from the same content sources for another time period that is representative of the average revenue and page views as expected for the business. The terms from these content items may be counted for the second time period to establish a baseline for comparison. The two groups of terms may be compared in the report generator and submitted to the UI component for display. One or more terms may be selected to filter the content to a manageable level for review. Each time a term is selected, the content items are filtered with the selected term and the terms from the filtered content items are re-displayed on the UI component. One of the content sources may be selected, the index consulted and the filtered content items for the selected source displayed on the UI component. In the filtered content items (e.g. filtered with the selected term) the business may determine that there is an issue with the product, there is an error on the retail website or that another better product is on the market, for example.

Figure 3:
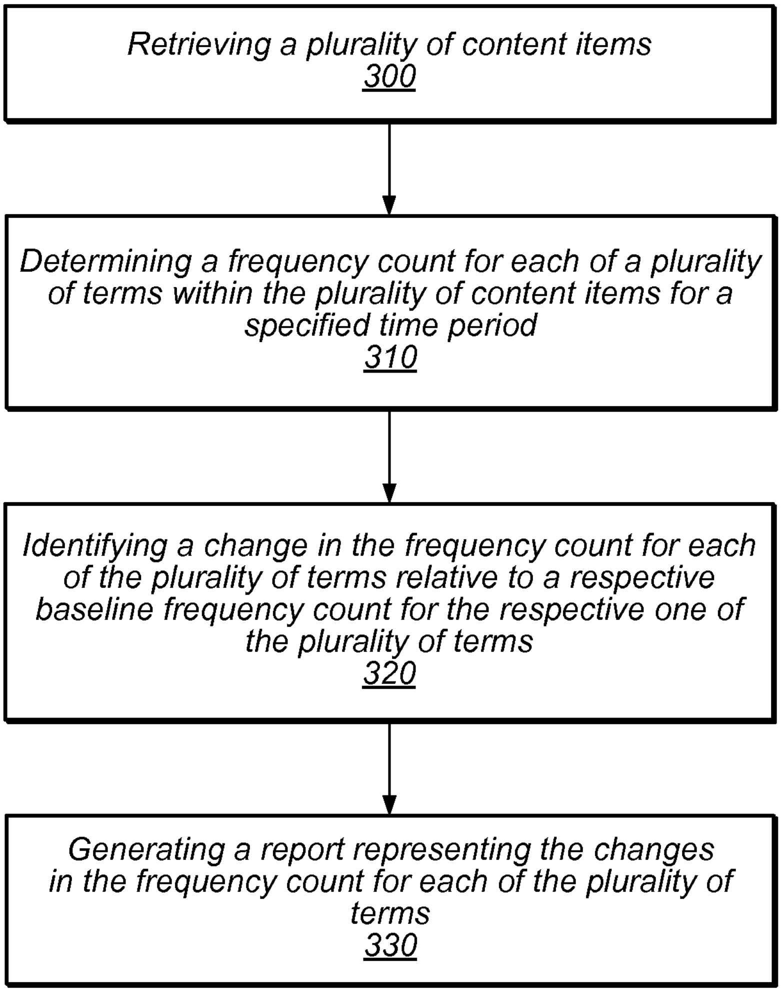
FIG. 3 is a flowchart of an exemplary method for analyzing content items in accordance with an embodiment of the present technique.

FIG. 3 illustrates an exemplary method for analyzing content items in accordance with an embodiment of the present technique. As discussed above, a content analyzer (e.g., content analyzer 120 in FIG. 1A) may be implemented on one or more computers, for example. In some embodiments, a plurality of content items are retrieved from one or more content sources, for example (e.g., content sources 110 in FIG. 1A). In some embodiments, the content items are retrieved for a given time period. In some embodiments, terms in the content items are determined and the frequency count is analyzed. In some embodiments, changes in the frequency count relative to a baseline in the frequency count are determined and a report generated.

As indicated in 300, in some embodiments, a plurality of content items are retrieved. In some embodiments, the plurality of content items retrieved are for a given time period (e.g., a particular date or range of dates). In some embodiments, the plurality of content items may be retrieved on a periodic basis (e.g. weekly, daily, etc.). In some embodiments, the plurality of content items retrieved includes particular terms (e.g., product or business names. The plurality of content items may be retrieved from one or more content sources, for example. In some embodiments, the plurality of content items are retrieved via an API configured to access particular content sources such as social media websites or retail websites. For example, these content sources may track and sell the large amount of user content and associated data received at their individual website. In other embodiments, all of the content items in the content source for a given time period is retrieved and locally parsed to determine the content items of interest. In some embodiments, the retrieved content items is narrowed to content items comprising terms of interest (e.g., product name, topic, etc.) for a given time period.

As indicated in 310, in some embodiments, the frequency count for each of a plurality of terms within the plurality of content items for a specified time period is determined. In some embodiments, the terms from the retrieved plurality of content items are determined. The retrieved plurality of content items may have non-contributing terms (e.g., stop words such as "the") removed, for example. In addition, in some embodiments, phrases may be included in the terms (e.g. product names, business brands). Punctuation may be removed to avoid analyzing terms such as "sale" and "sale!" separately, for example. The frequency count may be determined for the specified time period. The specified time period may be a particular date or a range of dates, for example. The time periods may be determined from information such as website traffic information, provided by other sources (e.g., from analytics server 130 in FIG. 2) In addition, in other embodiments, the frequency count for each of a plurality of terms within the plurality of content items is determined over multiple time periods in order to establish a baseline or average over time.

As indicated in 320, in some embodiments, the changes in the frequency count for each of the plurality of terms relative to a respective baseline frequency count for the respective one of the plurality of terms is identified. As discussed above in 310, there are several embodiments for determining the changes in the frequency count. The changes in the frequency count may be determined by comparing the frequency count for each of the plurality of terms between to given time periods (e.g., dates). One of the dates of comparison may be considered the baseline or normal activity, for example. In other embodiments, a baseline is predetermined by analyzing the frequency count for each of the plurality of terms over a given time period. The given time period may be a week, a running average over a week, a month or any other time frame of interest. In other embodiments, website traffic information determines the time periods of interest. The trends in the website traffic information may determine a baseline time period for comparison to a time period comprising a peak, a valley, or a statistical deviation from the average for example.

As indicated in 330, in some embodiments, a report representing the changes in the frequency count for each of the plurality of terms is generated. The report may display the terms with a color scheme indicating the direction of the change in the frequency count and the font size indicating the magnitude of the change in the frequency count, for example. In some embodiments, selecting a particular term filters the plurality of content items and the corresponding terms from the filtered plurality of content items. The terms from the filtered content items may be re-displayed, for example. Another term may be selected or a particular content source (e.g., content source 110 in FIG. 1A) may be selected, for example. In some embodiments, selecting a particular content source accesses the content index and displays the actual filtered content items associated with the selected terms. At each step in the filtering, the quantity of the plurality of content items contributing to the report may be displayed, for example. Examples of the report will be discussed in detail in FIG. 5.

Figure 4:
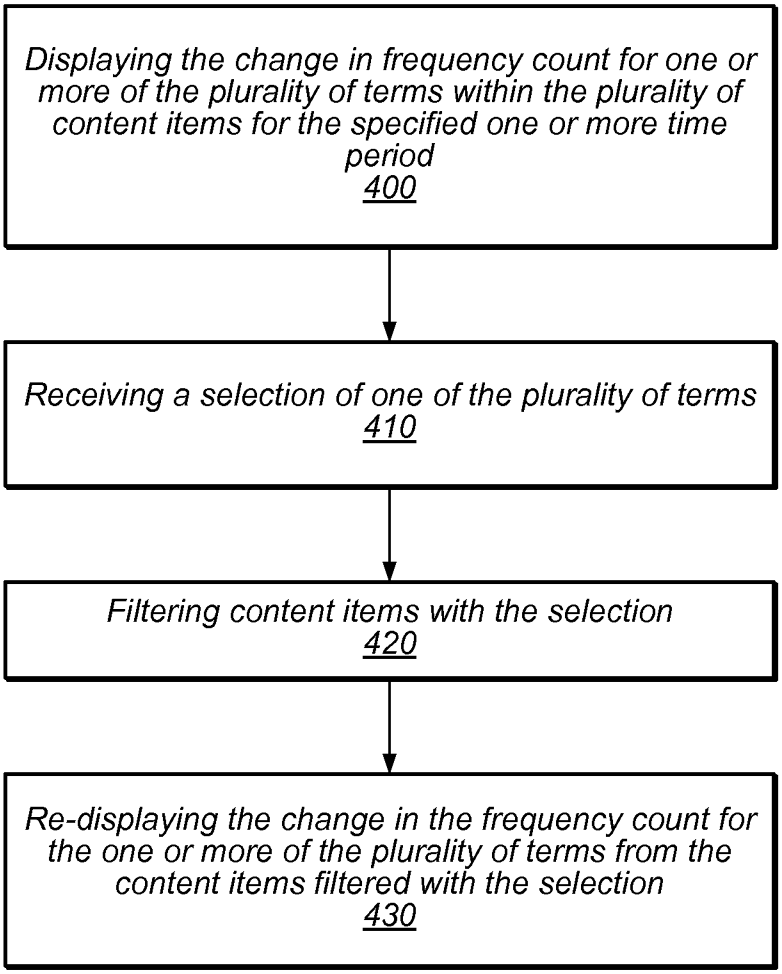
FIG. 4 is a flowchart of an exemplary method for a user interface to display the analyzed content items in accordance with an embodiment of the present technique.

FIG. 4 illustrates an exemplary method for a user interface to display the analyzed content items in accordance with an embodiment of the present technique. As discussed above, in some embodiments, the frequency count of each of the plurality of terms from the retrieved plurality of content items is determined. The counted terms from the plurality of content items may be displayed on the user interface, for example. In some embodiments, selected terms may be received from the user interface (e.g., user interface component in FIG. 2) and the selected terms may filter the plurality of content items. In addition, in some embodiments, receiving a content source selection causes the filtered content items to display at the user interface.

As indicated in 400, in some embodiments, the change in frequency count for one or more of the plurality of terms within the plurality of content items for the specified one or more time periods are displayed. As discussed above, the specified time period may be one or more particular time periods (e.g., particular dates, hourly, weekly) or a range of time periods. At least one of the particular dates or range of dates may represent a baseline, for example. In some embodiments, the display indicates the magnitude of the change in the frequency count through font size and the direction of the change through a color scheme. However, alternate embodiments may differentiate the data with other methods (e.g., word clouds, bar graphs, etc).

As indicated in 410, in some embodiments, a selection of one of the plurality of terms is received (e.g., from UI component 230 in FIG. 2). The selected term may be selected because of indications that the term experienced a large increase in the frequency count, for example. The selected term may be selected because of indications that the term is new to the plurality of content items, for example. The selected term filters the content items as indicated in 420. In some embodiments, each time a term is selected, the plurality of content items are filtered with the selected term. As indicated in 430, in some embodiments, the filtered content items are re-displayed to display only the changes in frequency count of terms from the filtered plurality of content items.

FIGS. 5A-D depict an exemplary set of reports in accordance with an embodiment of the present technique. In general, as discussed in previous figures, a content analyzer (e.g., content analyzer 120 in FIGS. 1A-B) may be configured to retrieve content items from content sources (e.g., content source 110 in FIGS. 1A-B). In some embodiments, the plurality of content items are indexed and the indexed terms may be counted. The frequency count of the indexed terms may be displayed at a user interface (e.g., UI component 230 in FIG. 2). In other embodiments, the change in the frequency count of indexed terms are displayed at the user interface. The changes in the frequency count may be determined by comparing the terms for two particular time periods (e.g., dates) or by comparing a particular time period to a baseline, as described above in FIG. 3. The content analyzer may receive selections for the terms and the content sources. Selecting a term further filters the content items and the changes in frequency count in terms from the filtered content items may be re-displayed on the user interface. Selecting a content source may display the actual content items comprising the selected terms. As discussed above, indexing may track information corresponding to the content source, content item and frequency count for each of the plurality of terms.

Figure 5A:
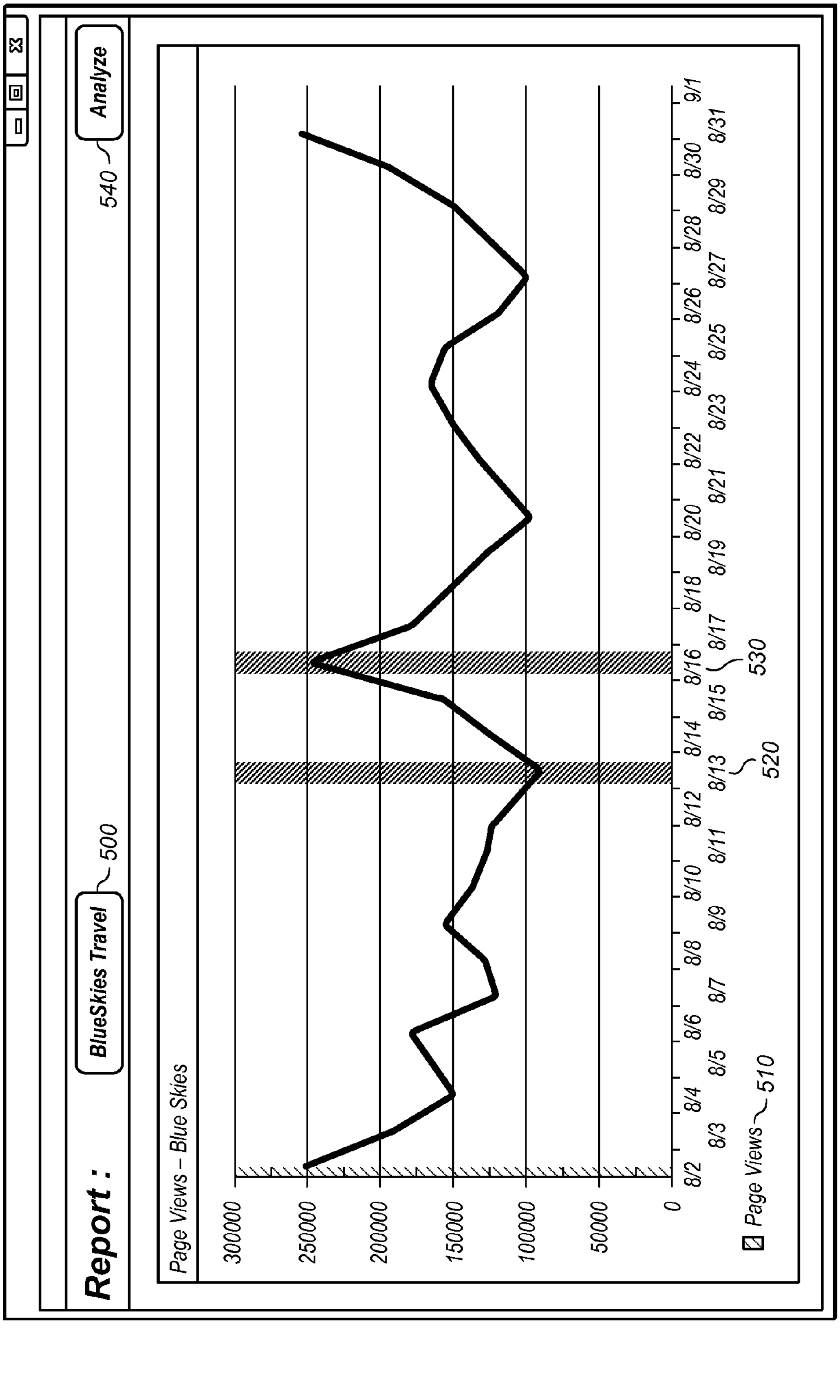

As depicted in FIG. 5A, a report of pages views for a business "BlueSkies Travel" 500 has been generated. The data for the report may be determined by an analytics server (e.g., analytics server 130 in FIG. 1B) configured to monitor page views 510. A marketer, for example, may be interested in determining from content available from content sources (e.g., content source 110 in FIGS. 1A-B) what may be contributing to the distinct change between the pages views on "8/13" 520 and the pages views on "8/16" 530. The marketer may select those dates and select the "Analyze" 550 feature.

Figure 5B:
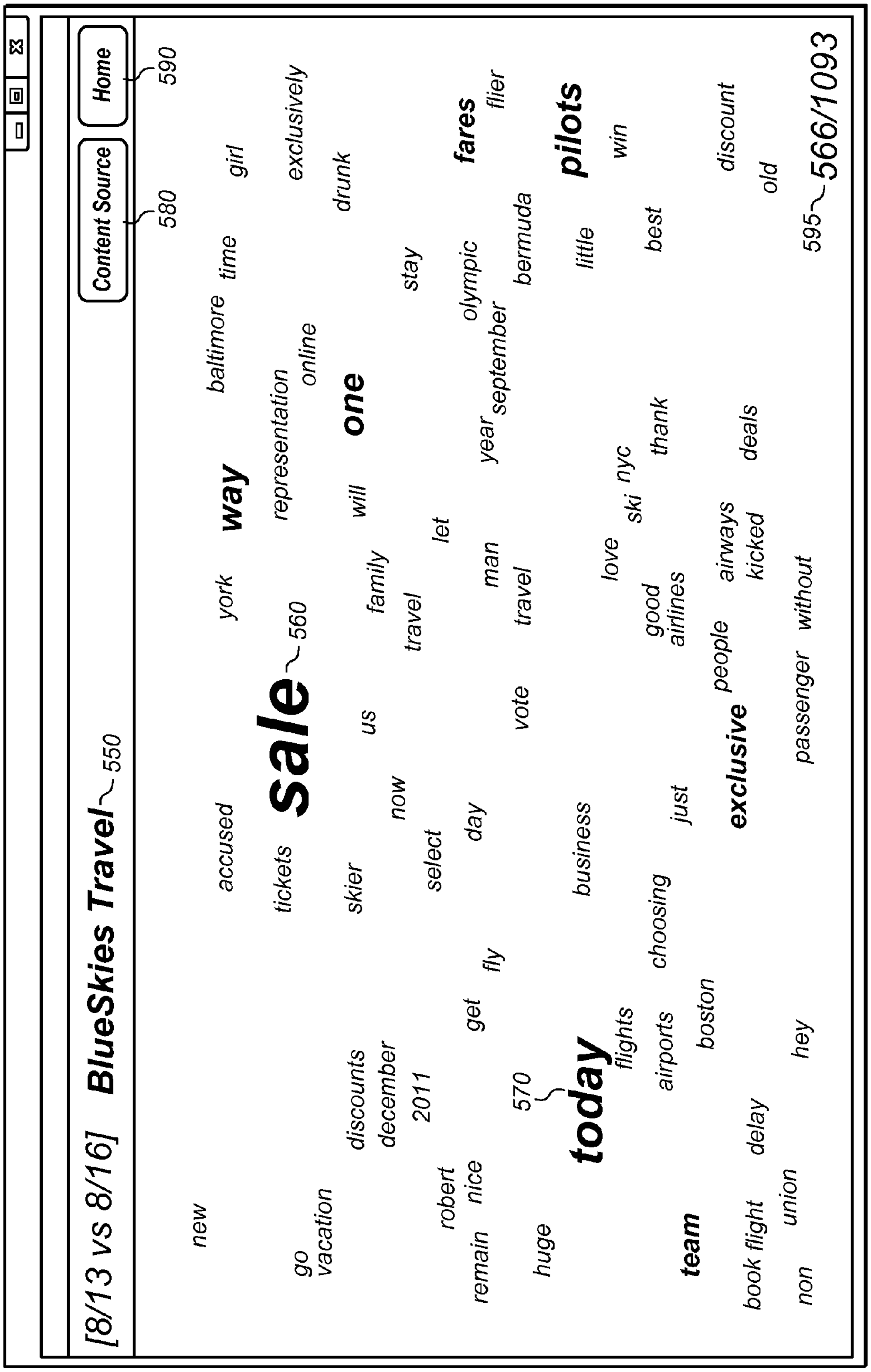

As depicted in FIG. 5B, a report displaying the change in the frequency of occurrence in terms between the time period of 8/13 and 8/16 for BlueSkies Travel 550. Selecting the "Analyze" 540 feature on the initial report display (e.g., FIG. 5A), causes the data collector (e.g. data collector 210 in FIG. 2) in content analyzer (e.g., content analyzer 120 in FIG. 1A-1B, FIG. 2) to retrieve content items (e.g. from dates 8/13 and 8/16) from one or more content sources (e.g., content sources 110 in FIGS. 1A and 1B). The terms in the content items may be counted (e.g. frequency counter 220). The font size indicates the magnitude of the change in frequency count of the indexed terms. For example, "sale" 560 has the greatest change in the frequency count followed by "today" 570 as indicated by the font size. In some embodiments, a color scheme may be used to indicate the direction of the change in the frequency count for each of the plurality of terms. In the lower right corner of the display, the quantity of content items 595 for each selected date is displayed. The first number "566" corresponds to the valley in the data for 8/13 in the report of FIG. 5A. The second number "1093" corresponds to the peak in the data for 8/16 in the report of FIG. 5A.

As depicted in 5C, a term has been selected and the content items have been filtered to re-display the terms from the filtered content items. The display (e.g., user interface component 230 in FIG. 2) shows the terms for the content items filtered with the terms "BlueSkies Travel" and "today" for the selected dates "8/13" and "8/16" 575. "Sale" 565 is still the term with the greatest magnitude of change in the frequency of occurrence. Other terms such as "online", "exclusively", "exclusive", "book" and "travel" 535 are prevalent in the content items, but a little less than "sale" 565 as indicated by the font size. It should also be noted that phrases such as "world traveler" and "travel deal" 545 are included in the terms. As described above, non-contributing words such as "the" are not analyzed. As described in FIG. 5B, the lower right corner of the display shows the quantity of content 555 utilized for the display. In this example, the number "5" is the quantity of content items for the "8/13" date and "170" is the quantity of content items for the "8/16" date. With the content items filtered to a reasonable amount to view, the content source 585 may be selected instead of selecting another term such as "sale" 565 to filter the content items further. Selecting the content source 585 will display the actual filtered content items retrieved from content sources. It should be noted that although a single content source is depicted in FIGS. 5A-5D, more than one content source may be included in the report.

Figure 5C:
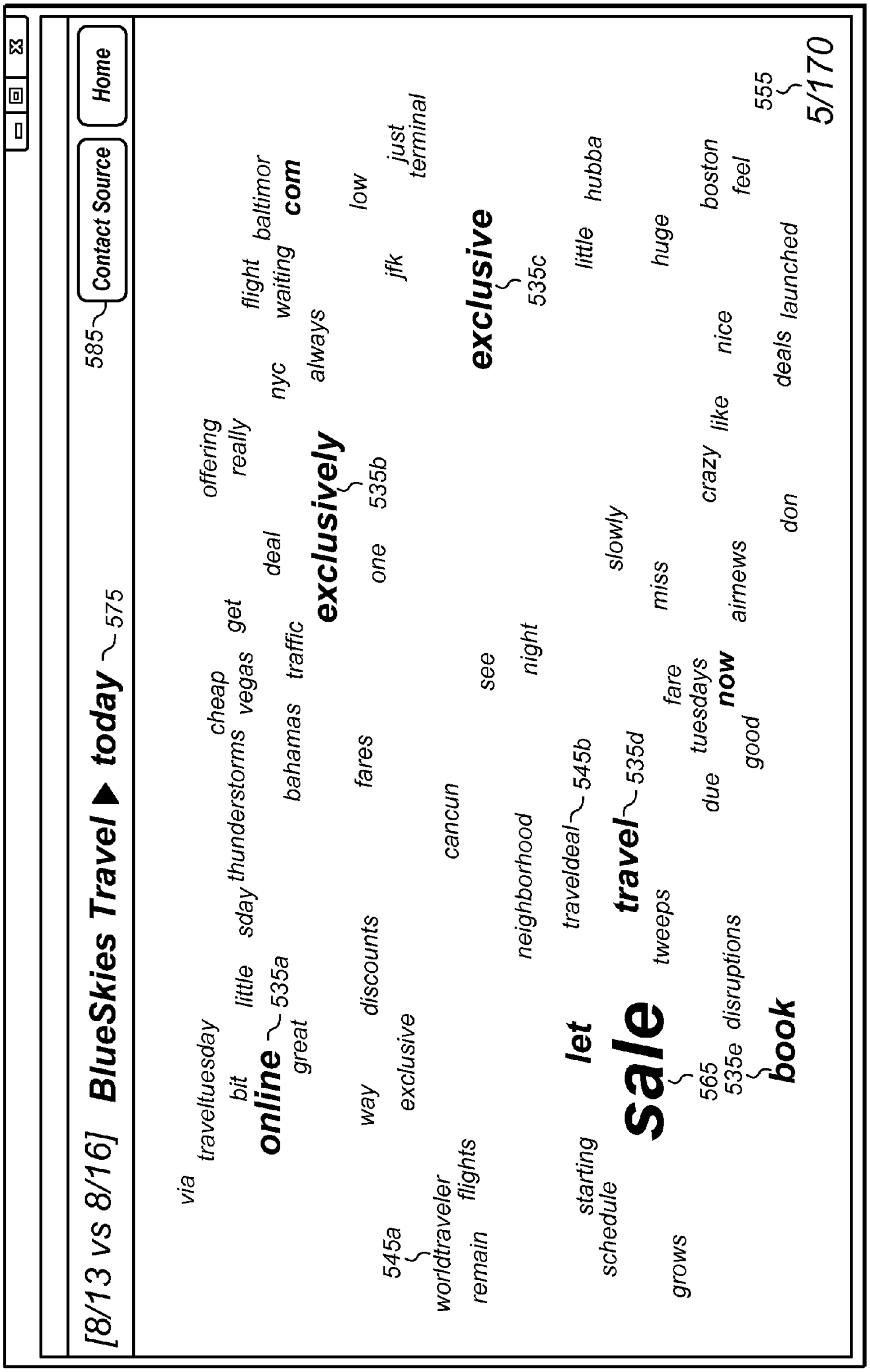

As depicted in FIG. 5D, the actual filtered content items for the terms displayed in FIG. 5C is displayed. The left column 525 displays the five filtered content items for the 8/13 date (e.g., "5/170" 555 in FIG. 5C). The right column 515 displays the one hundred and seventy filtered content items for the 8/16 date (e.g., "5/170" 555 in FIG. 5C). As indicated by the bold text, the terms used for filtering the content items are present in each individual content (e.g., BlueSkies Travel, today).

Exemplary Computer System

Figure 6:
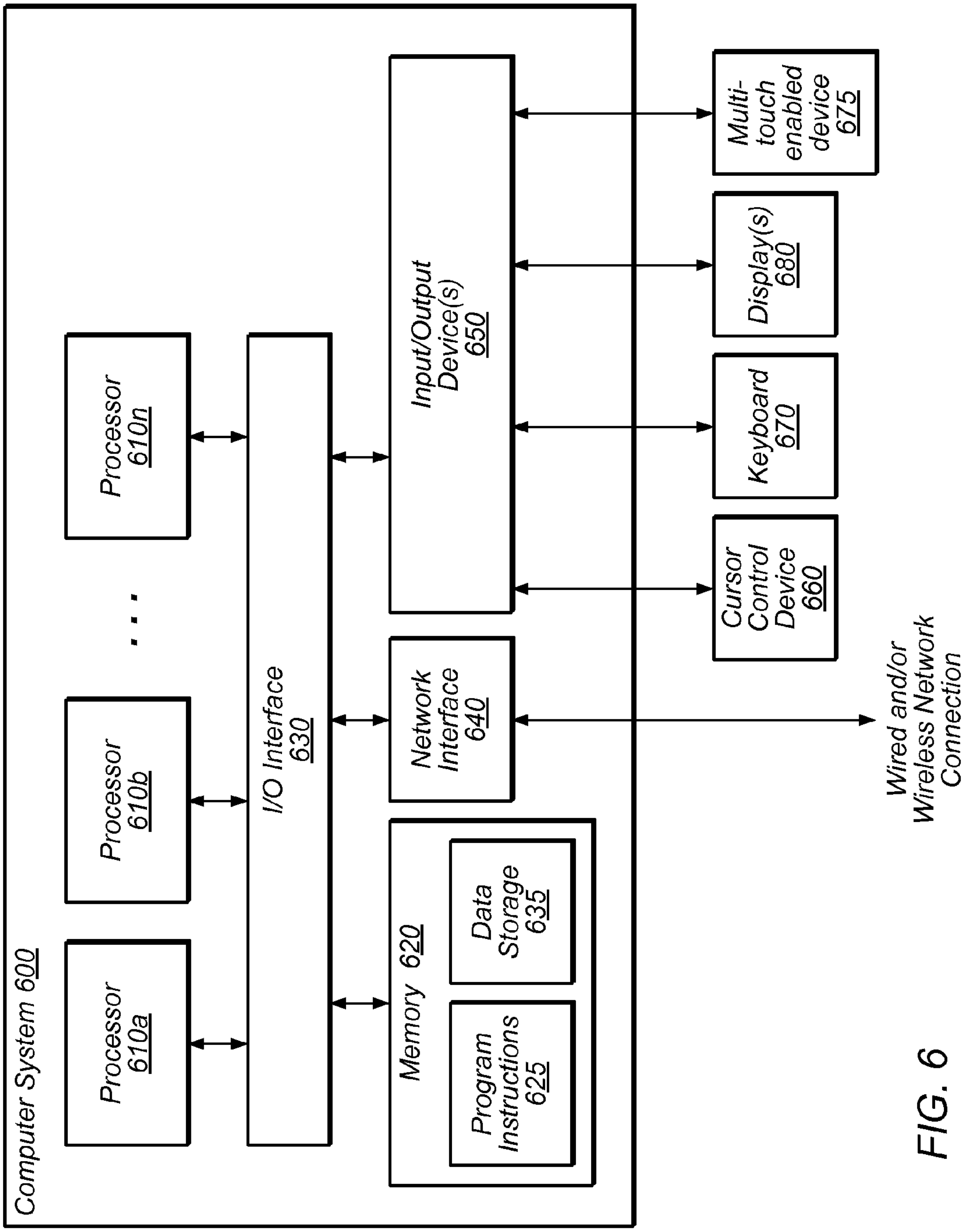
FIG. 6 illustrates an exemplary computer system in accordance with one or more embodiments of the present technique.

FIG. 6 is a diagram that illustrates an exemplary computer system 600 in accordance with one or more embodiments of the present technique. Various portions of systems 100 in FIGS. 1-3 and/or methods presented in FIGS. 4-5 and/or described herein, may be executed on one or more computer systems similar to that described herein, which may interact with various other devices of the system. For example, content analyzer 120 may be executed on a processor in a computing device (e.g., computing device 100 in FIG. 1A)

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, audio device 690, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640. Program instructions may include instructions for implementing the techniques described with respect to methods depicted in FIGS. 3-4.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., data collection server 160), such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, multi-touch screens, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions 625, configured to implement embodiments of a layout-preserved text generation method as described herein, and data storage 635, comprising various data accessible by program instructions 625. In one embodiment, program instructions 625 may include software elements of a method illustrated in the above Figures. Data storage 635 may include data that may be used in embodiments described herein. In other embodiments, other or different software elements and/or data may be included.

Those skilled in the art will appreciate that computer system 600 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer-implemented method comprising:

under control of a processor executing instructions, receiving a selection of a filter from a user device;

determining a baseline frequency count for each term of a plurality of terms in first content items published outside of a specified time period, wherein the first content items each include the filter, the baseline frequency count comprised of an average frequency count of each term for a baseline time period that is prior to the specified time period;

determining a changed frequency count for each term in second content items published within the specified time period, wherein determining the baseline frequency count and the changed frequency count includes indexing the respective terms comprising storing information including at least one of: an associated frequency count, an associated content item, or an associated content source;

determining a first change in frequency count for each term by comparing the baseline frequency count to the changed frequency count for each term;

displaying a report representing the first change in the frequency count for each term, the report graphically indicating, in font size, a magnitude of the first change in the frequency count for each term;

receiving a selected term included in the report;

filtering the first content items and the second content items by the filter and the selected term;

determining a second change in frequency count for each term by comparing the baseline frequency count to the changed frequency count for each term included in the filtered first content items and the filtered second content items; and displaying the report representing the second change in the frequency count for each term, the report graphically indicating, in font size, the magnitude of the second change in the frequency count for each term.

2. The computer-implemented method of claim 1 further comprising determining and comparing results in frequency counts for each of multiple terms included in the first content items and second content items.

3. The computer-implemented method of claim 1, wherein the specified time period is based on traffic information comprising one or more differences in trends of the traffic information.

4. The computer-implemented method of claim 1 wherein the report graphically indicates the magnitude of the change in the frequency count for the term by displaying the term with a graphically-distinguishing characteristic, the graphically-distinguishing characteristic including at least word groups or color schemes.

5. The computer-implemented method of claim 1, wherein the filter is a product name, a business name, a descriptive name associated with a product, or a topic of interest.

6. The computer-implemented method of claim 1, wherein the first content items and the second content items each include content items that are comments posted on a website or forum.

7. The computer-implemented method of claim 1, wherein the filter identifies a particular demographic.

8. A system, comprising a content item analyzer configured to:

at least one processor; and a memory comprising program instructions, wherein the program instructions are executable by the at least one processor to:

receive a selection of a filter from a user device;

determine a baseline frequency count for each term of a plurality of terms in first content items published outside of a specified time period, wherein the first content items each include the filter, the baseline frequency count comprised of an average frequency count of the term for a baseline time period that is prior to the specified time period;

determine a changed frequency count for each the term in second content items published within the specified time period, wherein determining the baseline frequency count and the changed frequency count includes indexing the respective terms comprising storing information including at least one of: an associated frequency count, an associated content item, or an associated content source:

determine a first change in frequency count for each term by comparing the baseline frequency count to the changed frequency count for each term;

displaying a report representing the first change in the frequency count for each term, the report graphically indicating, in font size, a magnitude of the first change in the frequency count for each term;

receive a selected term included in the report;

filter the first content items and the second content items by the filter and the selected term;

determine a second change in frequency count for each term by comparing the baseline frequency count to the changed frequency count for each term included in the filtered first content items and the filtered second content items; and display the report representing the second change in the frequency count for each term, the report graphically indicating, in font size, the magnitude of the second change in the frequency count for each term.

9. The system of claim 8, wherein the specified time period is based on traffic information comprising one or more differences in trends of the traffic information.

10. The system of claim 8 wherein the report graphically indicates the magnitude of the change in the frequency count for the term by displaying the term with a graphically-distinguishing characteristic, the graphically-distinguishing characteristic including at least word groups or color schemes.

11. A non-transitory computer readable storage medium storing computer-executable program instructions that when executed by a computer are configured to cause:

receiving a selection of a filter from a user device;

determining a baseline frequency count for each term of a plurality of terms in first content items published outside of a specified time period, wherein the first content items each include the filter, the baseline frequency count comprised of an average frequency count of each term for a baseline time period that is prior to the specified time period;

determining a changed frequency count for each term in second content items published within the specified time period, wherein determining the baseline frequency count and the changed frequency count includes indexing the respective terms comprising storing information including at least one of: an associated frequency count, an associated content item, or an associated content source;

determining a first change in frequency count for each term by comparing the baseline frequency count to the changed frequency count for each term;

displaying a report representing the first change in the frequency count for each the term, the report graphically indicating, in font size, a magnitude of the first change in the frequency count for each term;

receiving a selected term included in the report;

filtering the first content items and the second content items by the filter and the selected term;

determining a second change in frequency count for each term by comparing the baseline frequency count to the changed frequency count for each term included in the filtered first content items and the filtered second content items; and displaying the report representing the second change in the frequency count for each term, the report graphically indicating, in font size, the magnitude of the second change in the frequency count for each term.

12. The non-transitory computer readable storage medium of claim 11 further comprising determining and comparing results in frequency counts for each of multiple terms included in the first content items and second content items.

13. The non-transitory computer readable storage medium of claim 11, wherein the filter is a product name, a business name, a descriptive name associated with a product, or a topic of interest.

14. The non-transitory computer readable storage medium of claim 11 wherein the report graphically indicates the magnitude of the change in the frequency count for the term by displaying the term with a graphically-distinguishing characteristic, the graphically-distinguishing characteristic including at least word groups or color schemes.

15. The computer-implemented method of claim 1, wherein the selected term is associated with a positive sentiment or a negative sentiment with respect to the filter.

* * * * *